United States Patent [19]

Bradshaw

[11] Patent Number: 4,912,847
[45] Date of Patent: Apr. 3, 1990

[54] CUTTING TOOL FOR 'ENTX'-TYPE PLASTIC CONDUIT

[76] Inventor: William T. Bradshaw, 4391 Parkwest Oval, Cleveland, Ohio 44135

[21] Appl. No.: 280,238

[22] Filed: Dec. 5, 1988

[51] Int. Cl.⁴ .............................................. B21F 13/00
[52] U.S. Cl. ........................................ 30/91.2; 30/90.1
[58] Field of Search ...................... 30/91.2, 90.1, 90.2, 30/92; 7/107, 132; 81/9.4

[56] References Cited

U.S. PATENT DOCUMENTS

| | | | |
|---|---|---|---|
| 2,704,000 | 3/1955 | Miller | 30/91.2 |
| 2,778,255 | 1/1957 | Miller | 30/91.2 |
| 4,625,596 | 12/1980 | Makus | 30/91.2 |
| 4,815,210 | 3/1989 | Burrage | 30/176 |

FOREIGN PATENT DOCUMENTS 607075  8/1948  United Kingdom ................ 30/91.2

Primary Examiner—Frank T. Yost
Assistant Examiner—William Fridie, Jr.
Attorney, Agent, or Firm—Donald A. Bergquist

[57] ABSTRACT

A cutting tool is provided for cutting the shell only of wire-filled corrugated flexible plastic electrical conduit of the type known to the trade as 'ENTX'. The tool features a blade so spaced relative to an indexing device as to cut through the shell of the conduit proximal its maximum outside radius while the indexing device engages the conduit at an axial location proximal its minimum outside radius, said indexing device may also act as a stop to prevent the penetration of the blade beyond a predetermined radius in fixed relationship to said minimum outside radius.

9 Claims, 2 Drawing Sheets

2

4,912,847

CUTTING TOOL FOR 'ENTX'-TYPE PLASTIC CONDUIT

INTRODUCTION

A cutting tool is provided for cutting the shell only of wire-filled corrugated flexible plastic electrical conduit of the type known to the trade as 'ENTX'. The tool features a blade so spaced relative to an indexing device as to cut through the shell of the conduit proximal its maximum radius while the indexing device engages the conduit at an axial location proximal its minimum radius, said indexing device may also act as a stop to prevent the penetration of the blade beyond a predetermined radius in fixed relationship to said minimum radius.

Electricians have been provided with a most convenient and useful product in the form of a hard-walled plastic conduit made flexible by means of circumferential corrugations in the wall thereof. Thus, in the ideal product, a longitudinal cross section of the wall or shell of the conduit has the appearance of a modified square wave, and any transverse cross section appears as a circular annulus, and a major outside radius with a major inside radius or a smaller minor outside radius with a minor inside radius will alternatively appear, depending upon the axial location of the transverse cross section. The major inside radius corresponding with said major outside radius is larger than the minor outside radius.

In practice, whereas the outer surface shows the substantially square convolutions, the inner surface is not quite so well defined. It does have a clean minor inside radius and a larger or major inside radius, but the transition between them is not so clearly defined as on the outer surface; yet, the major inside radius is larger than the minor outside radius. This product is supplied without wiring, in which case it is called in the trade 'ENT', or with insulated wiring already installed within the conduit, in which case it is called in the trade 'ENTX'. The wiring is contacted by and supported by the inside walls of the conduit only at the wall surface defining the minor inside radius.

ENT conduit may easily be cut in the field by using a cutting tool of the type taught in U.S. Pat. No. 4,336,652, issued to D. D. Robertson in 1982. This tool has gained enormous popularity; it may be used to cut smooth-walled conduit as well as the newer corrugated conduit. The use of this tool on wire-filled conduit, ENTX, is not recommended because there is no way to protect the insulation on the insulated wires within the conduit from being inadvertently damaged by the blade and thereby creating the potential for a short circuit and a resulting electrical fire. The tool is simply not designed for that use.

There is a need in the residential and industrial building wiring industry for a tool to conveniently and safely make field cuts in corrugated ENTX conduit without damaging the wires pre-installed therein. Applicant has invented a tool to meet this need.

Thus, it is an object of this invention to provide a cutting tool for use in either the field or a shop, which tool is capable of cutting only the shell of corrugated ENTX electrical conduit, with no fear of damaging the wires pre-installed therein.

It is a further object of this invention to provide such a cutting tool that is safe and convenient to use.

It is a further object of this invention to provide such a cutting tool with a replaceable blade.

It is a further object of this invention to provide such a cutting tool with a reversible blade.

It is a further object of this invention to provide such a cutting tool of a unitary design that is capable of cutting the shell of ENTX conduit of more than one size.

DETAILED DESCRIPTION OF THE INVENTION

Figure 1:
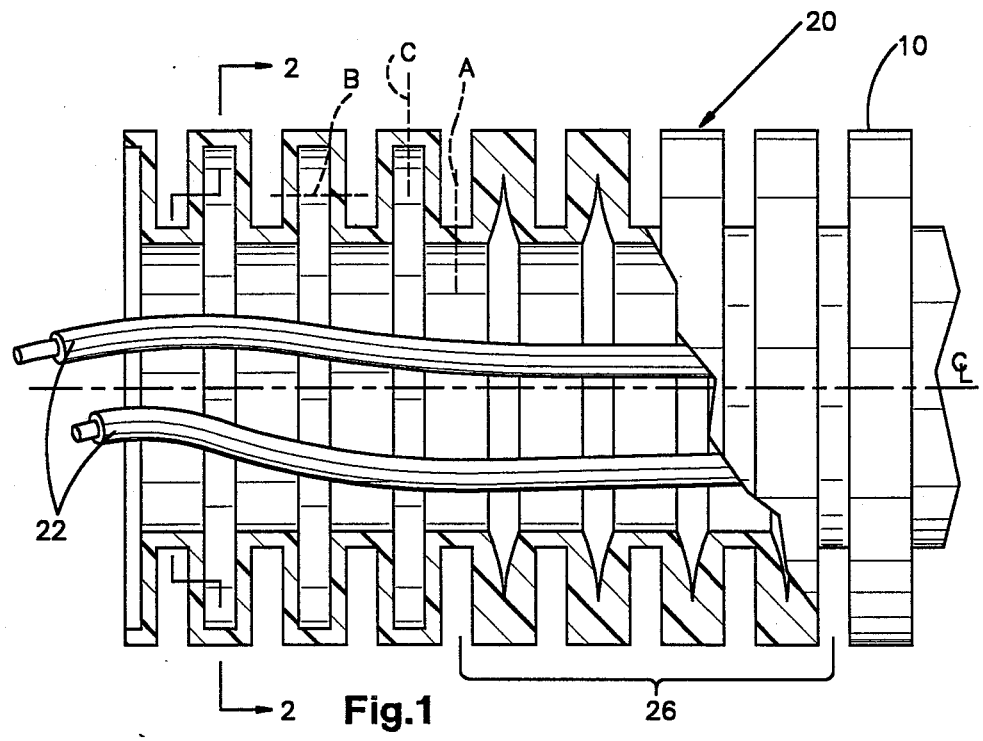
FIG. 1 shows ENTX conduit in partial cutaway to show various modes of cutting the shell.
Figure 2:
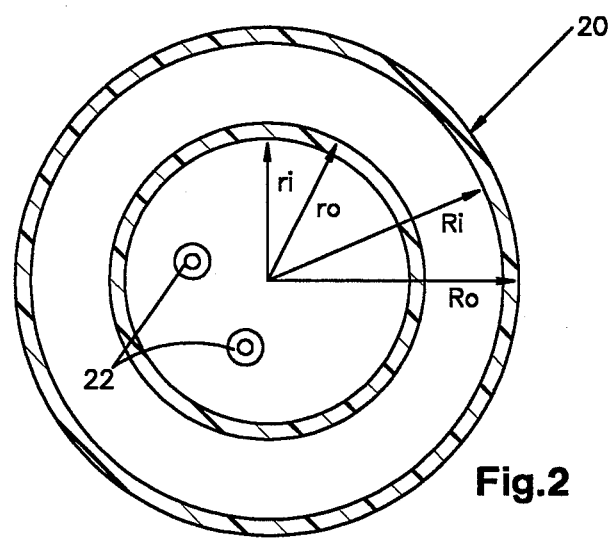
FIG. 2 shows the transverse cross section of ENTX conduit and the shell thereof at the locations indicated in FIG. 1.

ENTX conduit 10 is shown in cutaway in FIG. 1, in which is shown the shell 20 with several insulated wires 22 inside. FIG. 2 shows the transverse cross-section at the axial location indicated by 2—2 in FIG. 1. The shell is shown to have a minor inside radius ri, a larger major inside radius Ri, a minor outside radius ro, and a larger major outside radius Ro; the major inside radus Ri is shown to be larger than the minor outside radius ro. The drawing is idealized in that the transition from the minor inside radius ri to the major inside radius Ri is not so clear-cut as is shown. It is more likely to be seen in cross section as a sharp valley as indicated in FIG. 1 at 26. Whether idealized or real-world, the major inside radius Ri is always larger than is the minor outside radius ro.

In examining FIG. 1, it should be clear to one skilled in the art that cutting the shell of ENTX conduit at A should be easy because the convolutions of the tubing encourage a knife blade to slip into the space between the exterior ridges on the shell. Indeed, the cutting tool patented by Robertson, mentioned above, cuts ENT conduit at precisely that location. Coupling devices for ENT and ENTX conduit have been designed with such a cutting location in mind, in that indexing and gripping means are provided in the couplings to engage the space between the ridges to hold the conduit shell in the coupling against axial pull-out. A cut at A, however, would surely risk damage to the insulation on the wires within ENTX conduit.

A cut at B was considered. A simple tool could be devised to cut the shell at B while not infringing upon the space occupied by the wires within the ENTX conduit. The resulting cut end, however, is not suitable for use with the existing standard couplings for ENT conduit; redesigning the couplings would create confusion among field installers of ENTX conduit should old and new couplings be mixed, so the plan to cut the shell at B was rejected.

The only appropriate cut that would result in a cut end that is compatible with existing couplings was determined to be a cut at C. This cut leaves a sufficient ridge on both cut ends to be engaged by the existing standard couplings for ENT conduit. A cut of controlled depth made at C would not risk damage to the insulated wires within the ENTX conduit, as the blade need not enter the space in which the wires reside. Naturally, to cut the shell all the way around at any of these locations, the cutting blade must be revolved around the axis of the conduit; this is easily accomplished by swinging through an arc of 360 degrees (more or less) a cutting tool to which the blade is firmly attached. A further advantage over a cut at B is that no slivers of material are created that would clutter the work area and be hazards to the workers.

Making a cut at C, however, is not easily accomplished with a simple knife blade nor with cutting tools like that of Robertson. The outside surface of ENT and ENTX conduit is hard and smooth and the exterior ridges (at the major outside radius Ro) are slightly rounded in practice; as a result, a knife blade easily slips off the ridge and into the space between the ridges (proximal the minor outside radius ro). The tool of the present invention overcomes this problem.

Figure 5:
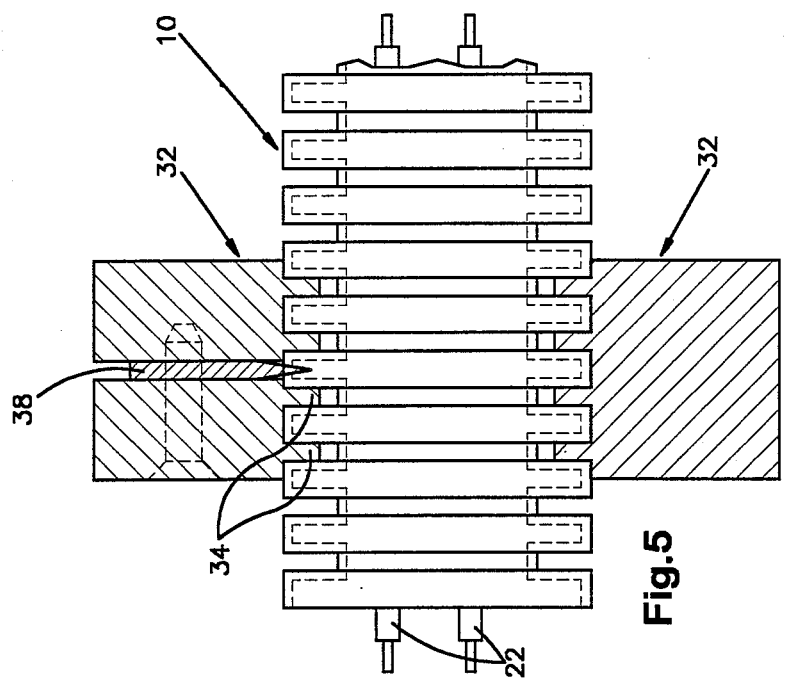
FIG. 5 shows ENTX conduit and the jaws of the cutting tool of this invention in cross-section to illustrate how the present invention provides a blade that will always cut the conduit at the preferred location.
Figure 3:
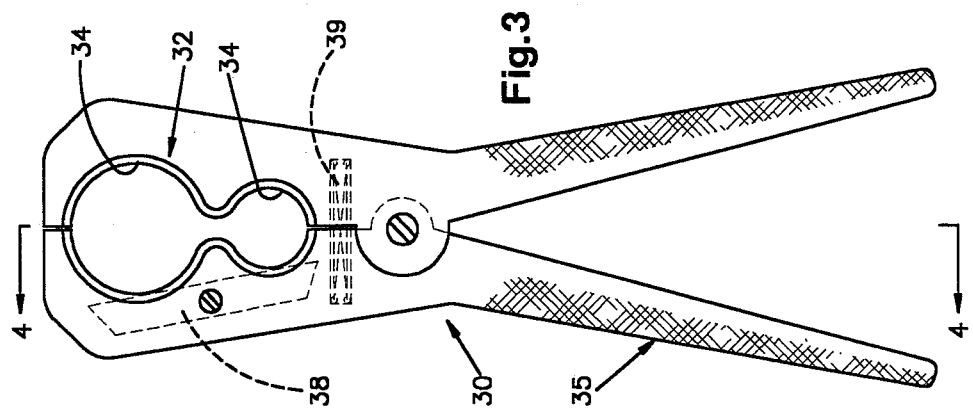
FIG. 3 shows the cutting tool in an embodiment wherein its cutting action is spring biased with a squeeze-to-open structure, the preferred embodiment.

FIG. 5 shows a the anvils 32 of the present invention 30, shown in its entirety in FIGS. 3 and 6, wherein the invention provides indexing means 34 to engage the space between the ridges and thereby to position the knife blade 38 on the major outside radius Ro. Having indexing means 34 on two opposing jaws 35 engaging the conduit shell 20 on substantially diametrically opposite sides, as in the best mode, further ensures that the cut made by the blade 38 is perpendicular to the axis of the conduit shell 20. The depth of the cut is controlled by the limited exposure of the knife blade 38 from the jaw 35. The depth of the cut may also be controlled by the depth to which the indexing means 34 engage the space between the ridges (the minor outside radius ro) relative to the edge of the knife blade 38. Thus, so long as the exposure of the knife blade 38 is not greater than the height of the indexing means 34, the knife will never penetrate the conduit shell 20 beyond the minor outside radius ro, which is always larger than the minor inside radius ri, so the shell 20 of the conduit 10 may be cut through without damaging the wires contained within.

Figure 4:
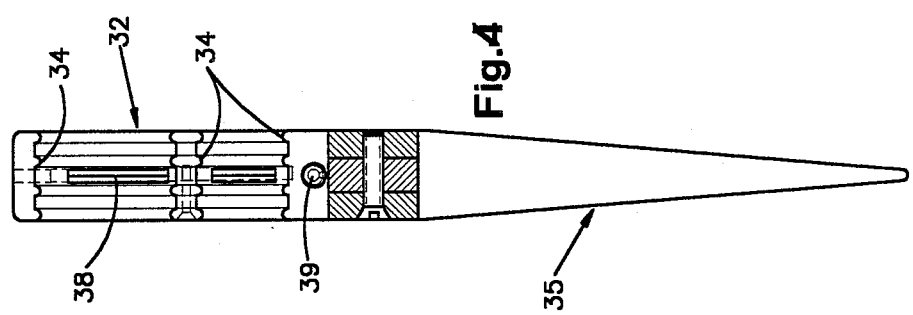
FIG. 4 shows the cutting tool of FIG. 3 in partial cutaway to show the working elements in the jaws.

Features of the best mode of the invention are shown in FIG. 3 and FIG. 4. These features include the connecting of the two jaws 35 in a squeeze-to-release embodiment with an expansion spring 39 or other biasing means to hold the anvils 32 closed. The alternative squeeze-to-close embodiment (not shown), similar to ordinary pliers, is considered the less desirable of these two embodiments. Other embodiments may be obvious to the reader, such as pivoting the jaws at one end rather than intermediate their ends.

Also apparent in FIG. 3 and FIG. 4 is the use of multiple cavities in tandem in the anvils 32 of the jaws 35 to enable the cutting of two or more different sizes of ENTX conduit with the same tool. Note that the best mode includes a single removable and replacable blade 38 that has exposure in each cavity.

FIG. 5 shows the spacing of the indexing means 34 relative to the knife blade 38. Only one indexing means is necessary for the functioning of the invention. Additional indexing means reinforce the design and function of the tool and may prove valuable in heavy field use of the tool wherein a single indexing means may become damaged and inoperable.

To use the cutting tool of this invention, one selects the location where a cut is desired, opens the anvils of the cutting tool to insert the conduit into the cylindrical concavity, positions the anvil at the axial location at which the indexing means will engage a groove between consecutive ridges on the conduit shell (or multiple grooves if multiple indexing means are present), squeezes the anvils together, thereby engaging the indexing means with said groove and the cutting blade with one ridge, and swings the jaws relative to the conduit to produce a slicing motion of the blade on the shell of the conduit at the location permitted by the indexing means.

Having thus described his invention, including a totally functional specific example thereof, applicant desires to include within the scope of his invention those improvements that would be immediately obvious to one skilled in the art, some, but not all of which have been referred to herein. Applicant desires the breadth of his invention to be limited only by the scope of the claims appended hereto.

I claim:

1. A cutting tool for cutting the shell of wire-filled corrugated flexible plastic conduit, the corrugated shell of said conduit having a major outside radius and a minor outside radius and corresponding major inside radius and minor inside radius, which inside radii and outside radii each alternate with a regular period of repetition along the axial direction of said conduit, said tool comprising a first handled jaw and a second handled jaw, said handled jaws pivotally connected and each having an anvil portion and a handle portion, at least the first one of said anvils having in the face thereof that opposes the other anvil a cylindrical concavity to receive said conduit and to restrict motion of said conduit transverse to the axis thereof when said conduit is placed against said first anvil, said first anvil having a knife blade mounted therein such that said blade intersects said concavity normal to the axis thereof with sufficient blade exposure within said concavity to allow said blade to penetrate to a poin within said major inside radius but outside of said minor inside radius of said corrugated shell when said conduit is fully engaged in said concavity, said first anvil also comprising an indexing means displaced from said knife blade by a distance sufficient for said indexing means to engage said corrugated shell at an axial position proximal said minor outside radius thereof while said knife blade engages said corrugated shell at said major outside radius thereof, whereby a conduit supported and properly indexed in said anvils can be cut readily by said knife blade upon squeezing said anvils together while swinging said tool relative to said conduit, but the cut will be always be at an axial location coinciding with said major outside radius as dictated by said indexing means, and only to a limited depth whereby said shell is cut without injury to the wires therein.

2. The cutting tool of claim 1 wherein said indexing means comprises a planar projection from said first anvil parallel to and congruent to said knife blade exposure, which projection thereby simultaneously serves as a guard for said knife blade.

3. The cutting tool of claim 1 wherein said indexing means comprises two planar projections from said first anvil parallel to and congruent to said knife blade exposure, one on each side of said knife blade, which projections thereby also serve as guards for said knife blade.

4. The cutting tool of claim 1 wherein said cylindrical concavity in said first anvil is defined by a circular cylinder of a radius substantially equal to said major outside radius of said conduit and wherein said indexing means comprises a planar projection from the inside surface of said concavity parallel to the plane of said knife blade and of constant height from said inside surface thereby defining a sector of an annulus, wherein said constant height is substantially equal to the difference between said major outside radius and said minor outside radius of said conduit, which projection thereby simultaneously serves as a guard for said knife blade.

5. The cutting tool of claim 4 wherein said indexing means comprises two congruent planar projections from the anvil parallel to said knife blade exposure, one on each side of said knife blade, wich projections thereby also serve as guards for said knife blade.

6. The cutting tool of claim 1 wherein said blade is removable, reversible, and replacable.

7. The cutting tool of claim 1, 2, 3, 4, 5, or 6 wherein the second of said anvils also comprises an indexing means axially displaced from said knife blade by a distance sufficient for said indexing means to engage said corrugated shell at an axial position proximal said minor radius thereof while said knife blade engages said corrugated shell at said major radius thereof, said second anvil may also comprise a second knife blade.

8. The cutting tool of claim 1, 2, 3, 4, 5, or 6 wherein each jaw comprises multiple similar anvils in tandem adapted for use in cutting conduit of different sizes.

9. A cutting tool for cutting the shell of wire-filled corrugated flexible plastic conduit, the corrugated shell of said conduit having a major outside radius and a minor outside radius and corresponding major inside radius and minor inside radius, which inside radii and outside radii each alternate with a regular period of repetition along the axial direction of said conduit, said tool comprising:

a first handled jaw and a second handled jaw, said handled jaws pivotally connected;

a knife blade having limited exposure from one of said jaws in a position to engage said corrugated shell for cutting the shell thereof, by means of said limited exposure, to a limited depth of cut that will not allow said blade to contact wires within said shell;

and an indexing means displaced from said knife blade by a distance sufficient for said indexing means to engage said corrugated shell at an axial position proximal said minor outside radius thereof while the knife blade engages said corrugated shell at said major outside radius thereof.

whereby a conduit supported and properly indexed in said jaws can be cut readily by said knife blade upon squeezing said jaws together while swinging said tool relative to said conduit, but the cut will be always be at an axial location coinciding with said major outside radius, as dictated by said indexing means, and only to a limited depth whereby said conduit shell is cut without injury to the wires therein.

* * * * *